(12) United States Patent
Huang (10) Patent No.: US 10,798,456 B2
(45) Date of Patent: Oct. 6, 2020

(54) METHOD AND DEVICE FOR PRESENTING INFORMATION

(71) Applicant: TENCENT TECHNOLOGY (SHENZHEN) COMPANY LIMITED, Shenzhen, Guangdong (CN)

(72) Inventor: Lin Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 174 days.

(21) Appl. No.: 16/032,659

(22) Filed: Jul. 11, 2018

(65) Prior Publication Data

US 2018/0324495 A1 Nov. 8, 2018

Related U.S. Application Data

(63) Continuation of application No. PCT/CN2017/071632, filed on Jan. 19, 2017.

(30) Foreign Application Priority Data

Jan. 27, 2016 (CN) .......................... 2016 1 0055872

(51) Int. Cl.
  *H04N 21/475* (2011.01)
  *H04N 21/2668* (2011.01)
  (Continued)

(52) U.S. Cl.
  CPC ..... *H04N 21/4751* (2013.01); *H04L 61/2507* (2013.01); *H04L 67/306* (2013.01);
  (Continued)

(58) Field of Classification Search
  None
  See application file for complete search history.

(56) References Cited

U.S. PATENT DOCUMENTS 8,131,745 B1 * 3/2012 Hoffman .............. G06Q 10/107
  707/766
10,026,097 B2 * 7/2018 Demsey .................. H04L 67/02
  (Continued)

FOREIGN PATENT DOCUMENTS

| CN | 102263999 A | 11/2011 |
| CN | 102625160 A | 8/2012 |

(Continued)

OTHER PUBLICATIONS

Office Action with Translation issued for Japanese Application No. 2018-539098 dated Oct. 7, 2019 in 6 pages.
(Continued)

*Primary Examiner* — Alexander Q Huerta
(74) *Attorney, Agent, or Firm* — Knobbe, Martens, Olson & Bear, LLP (57) ABSTRACT

The present disclosure describes a method and device for presenting information. An example method includes receiving an information presentation request sent from a first terminal and acquiring a first network address of the first terminal. At least one account according to the first network address, a first period to which a current time moment belongs, and a prestored correspondence between a network address, a period and an account are determined. Presentation information matching with account information of the at least one account is selected and the presentation information is sent to the first terminal.

18 Claims, 4 Drawing Sheets

(51) Int. Cl.
  *H04N 21/258* (2011.01)
  *H04N 21/81* (2011.01)
  *H04W 4/18* (2009.01)
  *H04L 29/12* (2006.01)
  *H04L 29/08* (2006.01)

(52) U.S. Cl.
  CPC . *H04N 21/25883* (2013.01); *H04N 21/25891* (2013.01); *H04N 21/2668* (2013.01); *H04N 21/812* (2013.01); *H04W 4/185* (2013.01); *H04L 61/2514* (2013.01)

(56) References Cited

U.S. PATENT DOCUMENTS

| | | | | |
|---|---|---|---|---|
| 2009/0049468 A1* | 2/2009 | Shkedi | ............... | G06Q 30/0241 725/34 |
| 2011/0099576 A1* | 4/2011 | Shkedi | ................... | H04N 7/163 725/34 |
| 2013/0159336 A1* | 6/2013 | Minamizawa | .......... | G06F 16/24 707/758 |
| 2015/0058393 A1* | 2/2015 | Smith | ..................... | H04L 67/10 709/201 |
| 2015/0106198 A1* | 4/2015 | Miller | ................ | G06Q 30/0251 705/14.52 |

FOREIGN PATENT DOCUMENTS

| | | |
|---|---|---|
| CN | 104038908 A | 9/2014 |
| CN | 104217346 A | 12/2014 |
| CN | 104796434 A | 7/2015 |
| CN | 104935661 A | 9/2015 |
| JP | 2005-173712 A | 6/2005 |
| JP | 2013-101687 A | 5/2013 |
| JP | 2013-150195 | 8/2013 |
| JP | 2015-043223 | 3/2015 |
| JP | 2015-158858 A | 9/2015 |

OTHER PUBLICATIONS

International Preliminary Report on Patentability issued for International Application No. PCT/CN2017/071632 dated Jul. 31, 2018 in 8 pages.
International Search Report with Translation for International Application No. PCT/CN2017/071632 dated Apr. 21, 2017.
Office Action with Concise Explanation of Relevance Issued for Chinese Application No. 201610055872.7 dated May 22, 2020 in 9 pages.
Office Action with Translation for Japanese Application No. 2018-539098 dated Jun. 8, 2020 in 6 pages.

* cited by examiner

METHOD AND DEVICE FOR PRESENTING INFORMATION

CROSS-REFERENCE TO RELATED APPLICATIONS

This application is a continuation of International Patent Application No. PCT/CN2017/071632, filed on Jan. 19, 2017, which claims priority to Chinese Patent Application No. 201610055872.7 filed on Jan. 27, 2016 and entitled "Method and Device for Presenting Information." The entire disclosures of each of the above applications are incorporated herein by reference in their entireties. Any and all applications for which a foreign or domestic priority claim is identified in the Application Data Sheet as filed with the present application are hereby incorporated by reference in their entirety under 37 CFR 1.57.

BACKGROUND

Field

The present disclosure relates to the field of computer technology, and particularly to a method and a device for presenting information.

Description of the Related Art

With the development of computer technology and network technology, smart televisions have been widely promoted. A user may watch a network video through a smart television. A network video server may push presentation information, such as news information and advertisement information, etc., while transmitting video data to the smart television.

Usually a certain time period of presentation information is added at a certain period in the network video. When the user uses the smart television to watch the network video, the network video may present the above-mentioned certain time period of presentation information at a corresponding time moment.

SUMMARY

To solve the problem in the prior art, various examples of the present disclosure provide a method and device for presenting information. The technical solution is described as follows.

In a first exemplary aspect, a method for presenting information is provided, the method including: receiving an information presentation request sent from a first terminal and acquiring a first network address of the first terminal; determining at least one account according to the first network address, a first period to which a current time moment belongs, and a prestored correspondence between a network address, a period and an account; and selecting presentation information matching with account information of the at least one account and sending the presentation information to the first terminal.

In a second exemplary aspect, a device for presenting information is provided, the device including: a processor and a non-transitory storage, wherein the non-transitory storage stores one or more computer readable instructions, and the processor executes the computer readable instructions stored in the non-transitory storage to: receive an information presentation request sent from a first terminal and acquire a first network address of the first terminal; determine at least one account according to the first network address, a first period to which a current time moment belongs, and a prestored correspondence between a network address, a period and an account; and select presentation information matching with account information of the at least one account and send the presentation information to the first terminal.

Various examples of the present disclosure provide a computer readable storage medium storing computer readable instructions which cause at least one processor to perform operations including: receiving an information presentation request sent from a first terminal and acquiring a first network address of the first terminal; determining at least one account according to the first network address, a first period to which a current time moment belongs, and a prestored correspondence between a network address, a period and an account; and selecting presentation information matching with account information of the at least one account and sending the presentation information to the first terminal.

BRIEF DESCRIPTION OF THE DRAWINGS

In order to illustrate the technical solution of the examples of the present disclosure more clearly, hereinafter drawings used in description of the examples are introduced briefly. Obviously, the described drawings are some examples of the present disclosure, and other drawings can be obtained by those skilled in the art without creative efforts according to these drawings.

DETAILED DESCRIPTION

To make the objective, technical solution and merits of the present disclosure more apparent, hereinafter the examples of the present disclosure are described in further detail in conjunction with the drawings.

In an example of the present disclosure, presentation information pushed by a server of a network video to different smart televisions playing the network video is the same, and information presented by users using the smart televisions is the same.

In order to present personalized information to the users, various examples of the present disclosure provide a method for presenting information, which may be implemented by a server. The server may be a server that is used for selecting presentation information and stores large amounts of presentation information such as advertisement information and news information, etc. Meanwhile, a user may register an account in the server, so that the server may provide the user with an appropriate service based on account information of the account. The server may include a processor, a memory and a communication component. The processor may perform processing such as selection and presentation of information described in flowing procedures. The memory may store data required and generated in the procedures described below. The communication component may be used for transmission of data in the procedures described below. In this example, the solution is described in further detail taking an execution subject being the server and the presentation information being advertisement information of commodities as an example. Other cases are similar to that of the present example and therefore are not repeated herein. In addition, a first terminal in the solution may be a smart television, which generally corresponds to a unique network address. The users of smart televisions usually take a family as a unit and are one-way propagation medium, thus there is not a login account corresponding to the users of the smart televisions.

Figure 1:
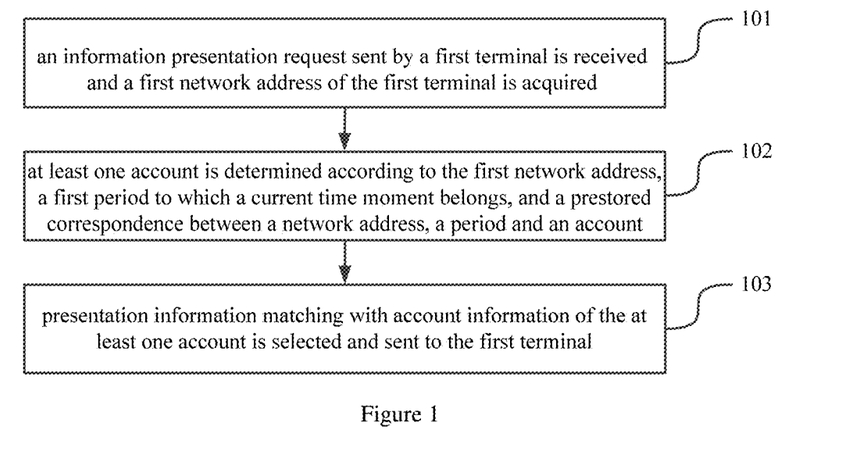
FIG. 1 is a flowchart illustrating a method for presenting information provided by examples of the present disclosure.

Hereinafter, the procedure illustrated in FIG. 1 is described in detail with reference to specific examples, which may include operations as follows.

At block 101, an information presentation request sent by a first terminal is received and a first network address of the first terminal is acquired.

Figure 2:
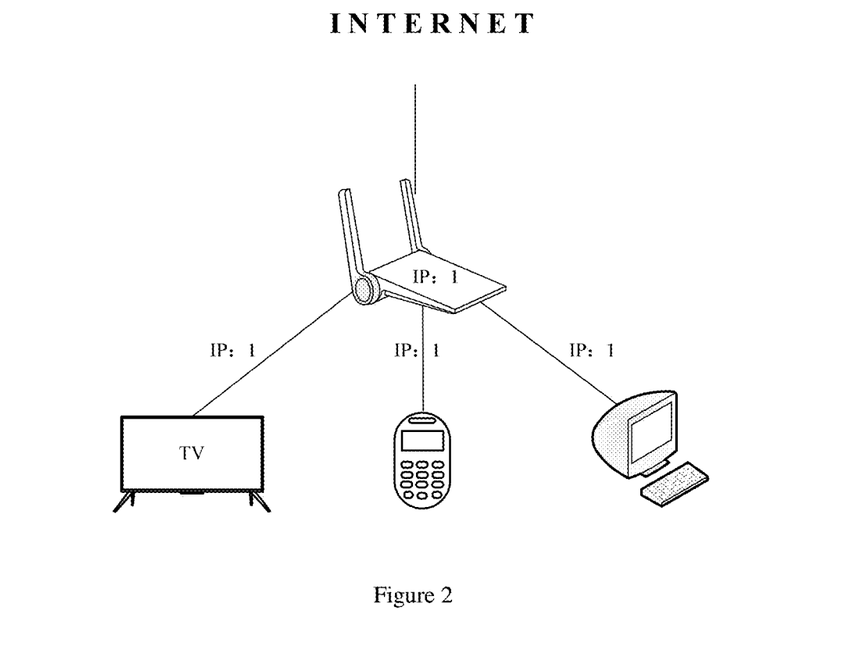
FIG. 2 is a schematic diagram illustrating a network framework for presenting information provided by examples of the present disclosure.

In an example, a user may watch a video on the first terminal through the network. When the video is played for a certain period of time or the total viewed time of the video reaches a preset time duration, the video may enter a preset presentation period for advertisement information (i.e., the presentation information). At this point the first terminal may send the information presentation request to the server, in which the information presentation request may carry a current first network address of the first terminal, such as an IP (Internet Protocol) address. After receiving the information presentation request, the server may acquire the current first network address of the first terminal. In this case, when multiple devices are connected to a same router, it may be determined that network addresses of the multiple devices are the same, referring to the network architecture as shown in FIG. 2.

At block 102, at least one account is determined according to the first network address, a first period to which a current time moment belongs, and a prestored correspondence between a network address, a period and an account.

In an example, the server may prestore a correspondence between the network address and the account, as shown in Table 1.

TABLE 1

| Network Address | Account |
| --- | --- |
| Network Address 1 | Account A |
|  | Account B |
| Network Address 2 | Account B |
|  | Account C |
| Network Address 3 | Account D |
| ... | ... |

In this case, one network address may correspond to multiple accounts, and one account may correspond to multiple network addresses. For example, account A and account B are family members, which access the Internet through a router of which a network address is network address 1. As such, a correspondence between network address 1, account A, and account B may be stored. After the server acquires the first network address of the first terminal, the server may determine at least one account corresponding to the first network address in the above-mentioned correspondence. For example, in the correspondence table described above, the first network address acquired is network address 2, thus the account corresponding to the first network address may be determined as account B, or account C, or account B plus account C.

The correspondence may be stored in another server. When the server in the present solution determines the account corresponding to the network address, the server may access the correspondence through a data interface provided by the other server. For example, the above-mentioned correspondence may be prestored in a first server. The first server may configure a data interface to provide a query service of the above-mentioned correspondence. When a second server needs to query the correspondence between the network address and the account, the second server may acquire the correspondence through the above-mentioned data interface.

Furthermore, for the same network address, accounts corresponding to different periods are not exactly the same. A correspondence between the network address and the account may be prestored in the server, as shown in Table 2.

After receiving the information presentation request sent by the first terminal, the server may acquire the first network address carried in the information presentation request and a current time moment. The server may search for the first network address and the first period to which the current time moment belongs in the prestored correspondence between the network address, the period, and the account, thereby determining an account corresponding to the first network address and the current time moment. For example, when the first network address is network address 1 and the current time moment is 11:00, corresponding account B may be determined in the correspondence shown in Table 2. In the case where the first terminal is a smart television, a user generally watches television programs at a fixed time every day, so that the above-described correspondence between the network address, the period, and the account is more feasible.

TABLE 2

| Network Address | Period | Account |
| --- | --- | --- |
| Network Address 1 | 7:00-9:00 | Account A |
|  | 9:00-12:00 | Account B |
|  | 19:00-21:00 | Account A&B |
| ... | ... | ... |

The number of service messages may be added to the above-described correspondence. Accordingly, the operations at block 102 may be described as follows: determining an account corresponding to the largest number of service messages according to the first network address, the first period to which the current time moment belongs, and the prestored correspondence between the network address, the period, the account, and the number of the sent service messages.

In an example, the server may prestore the correspondence between the network address, the period, the account, and the number of service messages sent by each account. After receiving the information presentation request sent by the first terminal, the server may acquire the first network address carried in the information presentation request and the current time moment. The server may search for the first network address and the first period to which the current time moment belongs in the prestored correspondence between the network address, the period and the account, thereby determining an account corresponding to the first network address and the current time moment. When the number of corresponding accounts is two or more than two, an account with the largest number of service messages may be determined based on the number of service messages sent by each account within the first period. For example, when the first network address is network address 1 and the current time moment is 20:00, corresponding accounts may be determined as account A and account B in the correspondence shown in Table 3. And then, as the number of service messages sent by account A is 100 and the number of service messages sent by account B is 70, account A may be selected.

TABLE 3

| Network Address | Period | Account | Service Message |
|---|---|---|---|
| Network Address 1 | 7:00-9:00 | Account A | 50 |
| | 9:00-12:00 | Account B | 90 |
| | 19:00-21:00 | Account A | 100 |
| | | Account B | 70 |
| ... | ... | ... | ... |

At block 103, presentation information matching with account information of the at least one account is selected and sent to the first terminal.

In an example, when registering an account in the server, the user may fill in basic account information to enable the server to provide a corresponding service. For example, when the user fills in the account information such as gender, age, hobbies and address, etc., the server may display presentation information in which the user may be interested to the user according to the account information of the user. After determining the at least one account corresponding to the first network address, the server may select presentation information matching with account information of the determined account from all of to-be-presented presentation information, and send the selected presentation information to the first terminal for presenting. For example, according to Table 1 described with operations at block 102, the first network address is network address 3, and the corresponding account is account D. The account information of account D acquired by the server includes a female, 25 years old, a shutterbug and a Beijing resident. The server may select advertisement information on cameras suitable for young women or information on tourist spots suitable for photography in Beijing, and then send the selected presentation information to the first terminal.

When one network address corresponds to multiple accounts, the server may select the best matching presentation information. Correspondingly, part of the operations at block 103 may be described as follows: in the multiple accounts, for each piece of presentation information, collecting the number of accounts of which account information matches with the presentation information, obtaining the number of matched accounts corresponding to each piece of presentation information, and selecting presentation information with the largest number of matched accounts.

In an example, after the server determines the more than one account corresponding to the network address, a matching situation of each piece of presentation information with the account information of the more than one account may be determined. For each piece of presentation information, the number of accounts corresponding to the account information matching with the presentation information may be selected. Presentation information with the largest number of matched accounts may be selected. For example, according to the example described at block 103, when network address 3 corresponds to account D and account E, and the account information of account E includes a male, 22 years old, a lover of mountaineering and a Beijing resident. Meanwhile, there are 3 pieces of presentation information in the server including a first presentation information being advertisement information on cameras suitable for young women, a second presentation information being information on tourist spots in mountain area near Beijing suitable for photography, and a third presentation information being information on jagged mountains that are challenging for the male. The server may determine that the number of accounts matching with the first presentation information is 1, the number of accounts matching with the third presentation information is 1, and the number of accounts matching with the second presentation information is 2, thus select the second presentation information.

Various examples of the present disclosure further provide a method for storing the correspondence between the network address, the period and the account. A corresponding processing procedure may be described as follows: receiving a service message sent from a third terminal, acquiring a current first network address of the third terminal, determining a second account which the third terminal currently logs in, determining a second period to which the current time moment belongs in multiple preset periods, and adding the first network address, the second period and the second account to the correspondence between the network address, the period and the account. In an example of the present disclosure, the correspondence between the network address, the period and the account may be stored in the form of Table 2 as described above. The first network address, the second period, and the second account may be used as an entry of Table 2.

In an example, after receiving the service message sent from a terminal (i.e., the third terminal), the server may acquire the first network address carried in the service message, determine the second account which the third terminal currently logs in based on the service message, and acquire the time (i.e., the current time moment) when the service message is sent. Then the server may determine the second period to which the current time moment belongs in multiple preset periods, and add the first network address, the second period and the second account to the correspondence between the network address, the period and the account. Specifically, based on the correspondence shown in Table 2, when the service message sent from the third terminal is received at 22:00, and it is determined that the account logged in is account C and the network address carried in the message is network address 1. It may be determined that the preset period to which 22:00 belongs is 21:00-23:00. Then, network address 1, 21:00-23:00 and account C may be respectively added to entries of Table 2 corresponding to field names of "Network Address", "Period" and "Account", respectively. The correspondence after performing the adding operation is shown in Table 4.

TABLE 4

| Network Address | Period | Account |
|---|---|---|
| Network Address 1 | 7:00-9:00 | Account A |
| | 9:00-12:00 | Account B |
| | 19:00-21:00 | Account A&B |
| | 21:00-23:00 | Account C |
| ... | ... | ... |

Similarly, when the correspondence between network address 1 and account C is acquired at 11:00, the correspondence after performing the adding operation based on Table 2 is shown in Table 5.

TABLE 5

| Network Address | Period | Account |
|---|---|---|
| Network Address 1 | 7:00-9:00 | Account A |
| | 9:00-12:00 | Account B&C |
| | 19:00-21:00 | Account A&B |
| ... | ... | ... |

For a certain period, when there is no corresponding account added for a network address within this period, an account corresponding to this period may be determined as all accounts corresponding to the network address within other periods by default. A corresponding processing procedure may be described as follows: when a service message sent from any terminal with the first network address is not received within a third period in the multiple periods, acquiring all accounts corresponding to the first network address from the correspondence, and adding the first network address, the third period and all accounts corresponding to the first network address to the correspondence between the network address, the period and the account.

In an example, an account addition cycle may be configured. During each cycle, a situation of service messages sent by each network address within each period may be recorded. At the end of the account addition cycle, the above-described correspondence between the network address, the period and the account may be updated. The updated correspondence may be used in a next cycle. When there is no corresponding account added for a certain network address (i.e., the first network address) within a certain period (i.e., the third period) in the correspondence, i.e., the service message sent from any terminal with the first network address is not received within the third period in the multiple periods, all accounts corresponding to the first network address in other periods may be acquired, then the acquired accounts may be added as an account corresponding to the third period and the first network address. Based on the above-described example, the processing herein may be shown in Table 6.

TABLE 6

| Network Address | Period | Account |
|---|---|---|
| Network Address 1 | 7:00-9:00 | Account A |
| | 9:00-12:00 | Account B&C |
| | 19:00-21:00 | Account A&B |
| | Remaining Period | Account A&B&C (default) |
| ... | ... | ... |

For the above-described period within which no account is added, the correspondence may be updated immediately when a service message is received within the period. A corresponding processing procedure may be described as follows: when the service message sent from the third terminal with the first network address is received within the third period, the account corresponding to the first network address and the third period is modified, in the correspondence, as the third account which the third terminal currently logs in.

In an example, when the service message sent from any account with the first network address is not received in the third period, the correspondence between the network address, the period and the account is set according to the above-mentioned solution. In a current account addition cycle, when the service message sent by the third terminal with the first network address is received in the third period, the above-mentioned correspondence may be updated immediately, that is, the account corresponding to the first network address and the third period is modified as the third account which the third terminal currently logs in.

When the user occasionally uses a network address within a certain period of time, the server may not establish a correspondence between the network address and the account of the user. A corresponding processing procedure may be described as follows: when the number of service messages corresponding to the first network address and the second account and received within the second period reaches a second preset threshold, adding the first network address, the second period and the second account to the correspondence between the network address, the period and the account.

In an example, after receiving a service message of the second account in the second period, the server may acquire the first network address carried in the service message and record the number of occurrences of the second account and the first network address in the second period. When the number of service messages corresponding to the first network address and the second account and received in the second period reaches the second preset threshold, the first network address may be determined as a commonly-used network address of the second account, and the second period may be determined as a resident period of the second account. As such, the first network address, the second account and the second period may be added to the correspondence between the network address, the period and the account. Conversely, when the number of occurrences of the second account and the first network address in the second period is less than a first preset threshold, it may be determined that the second account is not the resident account of the first network address in the second period, and it is not necessary to store a correspondence between the second account, the second period, and the first network address.

According to various examples of the present disclosure, an information presentation request sent from the first terminal is received; the current first network address of the first terminal is acquired; corresponding at least one account is determined according to the first network address, the first period to which the current time moment belongs, and the prestored correspondence between the network address, the period and the account; the presentation information matching with account information of the at least one account is selected; and the presentation information is sent to the first terminal. In this way, the server may determine related information of the user according to the network address, and thus may send presentation information meeting actual needs of the user to the terminal, which improves the effectiveness of the presentation information.

Figure 3:
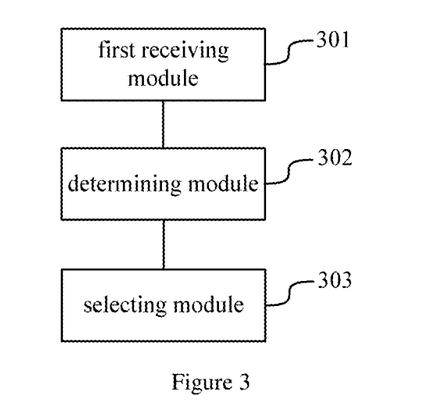
FIG. 3 is a schematic diagram illustrating structure of a device for presenting information provided by examples of the present disclosure.

Various examples of the present disclosure further provide a device for presenting information, as shown in FIG. 3, the device may include: a first receiving module 301, which is configured to receive an information presentation request sent from a first terminal and acquire a first network address of the first terminal; a determining module 302, which is configured to determine at least one account according to the first network address, a first period to which a current time moment belongs, and a prestored correspondence between a network address, a period and an account; and a selecting module 303, which is configured to select presentation information matching with account information of the at least one account and send the presentation information to the first terminal.

Figure 4:
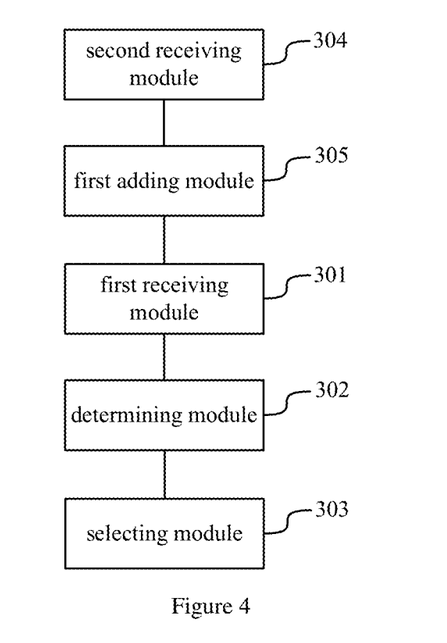
FIG. 4 is a schematic diagram illustrating structure of a device for presenting information provided by examples of the present disclosure.

As shown in FIG. 4, the device may further include: a second receiving module 304, which is configured to receive a service message sent from a second terminal, acquire a first network address of the second terminal, determine a second account which the second terminal currently logs in, and determine a second period to which the current time moment belongs in multiple preset periods; and a first adding module 305, which is configured to add the first network address, the second period, and the second account to the correspondence between the network address, the period, and the account.

Figure 5:
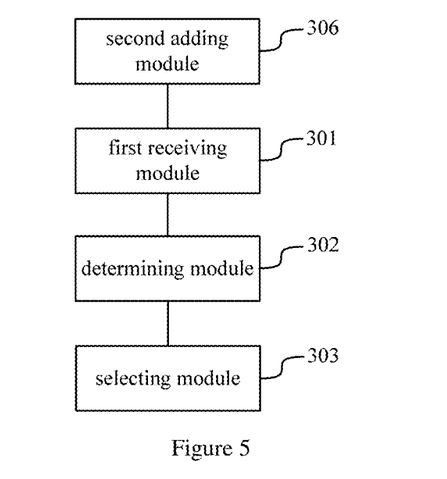
FIG. 5 is a schematic diagram illustrating structure of a device for presenting information provided by examples of the present disclosure.

As shown in FIG. 5, the device may further include: a second adding module 306, which is configured to acquire all accounts corresponding to the first network address from the correspondence when a service message sent from any terminal with the first network address is not received within a third period in the multiple periods, and add the first network address, the third period, and all accounts corresponding to the first network address to the correspondence between the network address, the period, and the account.

Figure 6:
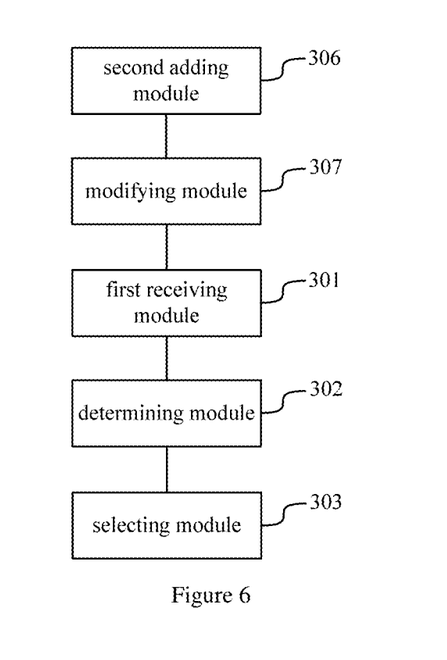
FIG. 6 is a schematic diagram illustrating structure of a device for presenting information provided by examples of the present disclosure.

As shown in FIG. 6, the device may further include: a modifying module 307, which is configured to modify, in the correspondence when a service message sent from a third terminal with the first network address is received within the third period, an account corresponding to the first network address and the third period as a third account which the third terminal currently logs in.

The second adding module 306 is configured to add the first network address, the second period and the second account to the correspondence between the network address, the period and the account when the number of service messages corresponding to the first network address and the second account and received within the second period reaches a second preset threshold.

In the correspondence, the first network address corresponds to multiple accounts.

For each piece of presentation information, the selecting module 303 is configured to collect, in the multiple accounts, the number of accounts of which account information matches with the presentation information, obtain the number of matched accounts corresponding to each piece of presentation information, and select presentation information with the largest number of matched accounts.

The determining module 302 is configured to determine an account with the largest number of service messages according to the first network address, the first period to which the current time moment belongs, and a prestored correspondence between the network address, the period, the account, and the number of sent service messages.

According to various examples of the present disclosure, an information presentation request sent from the first terminal is received; the current first network address of the first terminal is acquired; corresponding at least one account is determined according to the first network address, the first period to which the current time moment belongs, and the prestored correspondence between the network address, the period and the account; the presentation information matching with account information of the at least one account is selected; and the presentation information is sent to the first terminal. In this way, the server may determine related information of the user according to the network address, and thus may send presentation information meeting actual needs of the user to the terminal, which improves the effectiveness of the presentation information.

It should be noted that when the device for presenting information provided by the above-mentioned examples presents information, the device is illustrated by the division of the above-mentioned functional modules. In practice, the above-mentioned functions may be assigned and completed by different functional modules as needed, that is, the internal structure of the server may be divided into different functional modules to complete all or part of the functions described above. In addition, the device for presenting information provided by the above examples and the method examples for presenting information belong to the same concept, the detailed implementation of the device may be found in the method examples and is not repeated herein.

Figure 7:
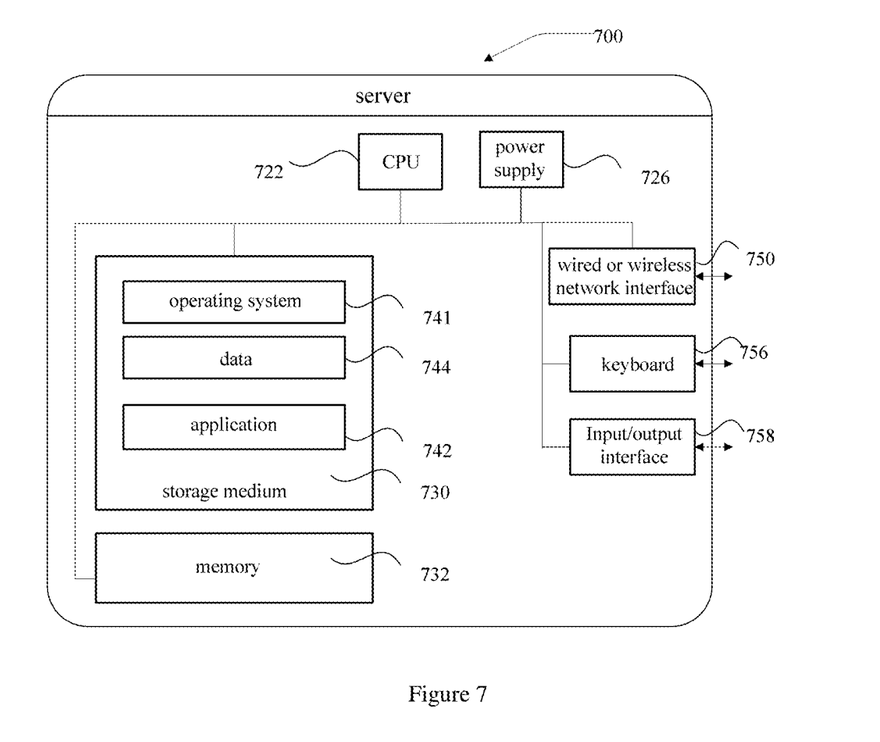
FIG. 7 is a schematic diagram illustrating structure of a server provided by examples of the present disclosure.

FIG. 7 is a schematic diagram illustrating structure of the server provided by examples of the present disclosure. The server may implement the method for presenting information provided in the above-mentioned examples.

The server 700 may have a relatively large difference due to different configuration or performance, and may include one or more central processing units (CPUs) 722 (e.g., one or more than one processor) and a memory 732, one or more than one storage medium 730 (e.g., one or more than one mass storage device) storing application 742 or data 744. Herein, the memory 732 and the storage medium 730 may be a transitory storage or a non-transitory storage. The application stored in the storage medium 730 may include one or more than one module (not shown in the figure), in which each module may include a series of instruction operations in the server. Furthermore, the central processing unit 722 may be configured to communicate with the storage medium 730 to perform the series of instruction operations in the storage medium 730 on the server 700.

The server 700 may further include one or more than one power source 726, one or more than one wired or wireless network interface 750, one or more than one input/output interface 758, one or more than one keyboard 756, and/or one or more than one operating system 741, such as Windows Server™, Mac OS X™, Unix™, Linux™, FreeBSD™, etc.

The server 700 may include a memory and one or more than one application which may be stored in the memory. One or more than one processor may be configured to execute the one or more than one application to perform operations including: receiving an information presentation request sent from a first terminal and acquiring a first network address of the first terminal; determining at least one account according to the first network address, a first period to which a current time moment belongs, and a prestored correspondence between a network address, a period and an account; and selecting presentation information matching with account information of the at least one account and sending the presentation information to the first terminal.

The method may further include: receiving a service message sent from a second terminal, acquiring a first network address of the second terminal, determining a second account which the second terminal currently logs in, and determining a second period to which the current time moment belongs in multiple preset periods; and adding the first network address, the second period, and the second account to the correspondence between the network address, the period, and the account.

The method may further include: when a service message sent from any terminal with the first network address is not received within a third period in the multiple periods, acquiring all accounts corresponding to the first network address from the correspondence, and adding the first network address, the third period, and all accounts corresponding to the first network address to the correspondence between the network address, the period, and the account.

The method may further include: when a service message sent from a third terminal with the first network address is received within the third period, modifying, in the correspondence, an account corresponding to the first network address and the third period as a third account which the third terminal currently logs in.

The operation of adding the first network address, the second period, and the second account to the correspondence between the network address, the period, and the account may include: when the number of service messages corresponding to the first network address and the second account and received within the second period reaches a second preset threshold, adding the first network address, the second period and the second account to the correspondence between the network address, the period and the account.

In the correspondence, the first network address corresponds to multiple accounts.

The operation of selecting the presentation information matching with the account information of the at least one account may include: for each piece of presentation information, collecting, in the multiple accounts, the number of accounts of which account information matches with the presentation information, obtaining the number of matched accounts corresponding to each piece of presentation information; and selecting presentation information with the largest number of matched accounts.

The operation of determining the at least one account according to the first network address, the first period to which the current time moment belongs, and the prestored correspondence between the network address, the period and the account may include: determining an account with the largest number of service messages according to the first network address, the first period to which the current time moment belongs, and a prestored correspondence between the network address, the period, the account, and the number of sent service messages.

According to various examples of the present disclosure, an information presentation request sent from the first terminal is received; the current first network address of the first terminal is acquired; corresponding at least one account is determined according to the first network address, the first period to which the current time moment belongs, and the prestored correspondence between the network address, the period and the account; the presentation information matching with account information of the at least one account is selected; and the presentation information is sent to the first terminal. In this way, the server may determine related information of the user according to the network address, and thus may send presentation information meeting actual needs of the user to the terminal, which improves the effectiveness of the presentation information.

Those skilled in the art may understand that all or part of the procedures of the methods of the above examples may be implemented by hardware or by hardware following machine readable instructions. The machine readable instructions may be stored in a computer readable storage medium. The storage medium may be ROM (Read-Only Memory), diskette, or CD, etc.

What has been described and illustrated herein is an example of the present disclosure along with some of its variations. The examples described herein are set forth by way of illustration only and are not meant as limitations. Any variations, equivalents, and improvements made within the spirit and principle of the present disclosure should be included in the protection scope of the present disclosure.

What is claimed is:

1. A method for presenting information, applied to a computing device, comprising:
   receiving an information presentation request sent from a first terminal;
   acquiring a first network address of the first terminal;
   determining at least one account according to the first network address, a first period to which a current time moment belongs, and a prestored correspondence between a network address, a period and an account; and
   selecting presentation information matching with account information of the at least one account; and
   sending the presentation information to the first terminal;
   wherein the determining the at least one account according to the first network address, the first period to which the current time moment belongs, and the prestored correspondence between the network address, the period and the account comprises:
   determining an account with a maximum number of service messages according to the first network address, the first period to which the current time moment belongs, and a prestored correspondence between the network address, the period, the account, and the number of sent service messages.

2. The method of claim 1, further comprising:
   receiving a service message sent from a second terminal, acquiring a first network address of the second terminal, determining a second account which the second terminal currently logs in, and determining a second period to which the current time moment belongs in multiple preset periods; and
   adding the first network address, the second period, and the second account to the correspondence between the network address, the period, and the account.

3. The method of claim 2, further comprising:
   when a service message sent from any terminal with the first network address is not received within a third period in the multiple periods, acquiring all accounts corresponding to the first network address from the correspondence, and adding the first network address, the third period, and all accounts corresponding to the first network address to the correspondence between the network address, the period, and the account.

4. The method of claim 3, wherein after the adding the first network address, the third period, and all accounts corresponding to the first network address to the correspondence between the network address, the period, and the account, the method further comprises:
   when a service message sent from a third terminal with the first network address is received within the third period, modifying, in the correspondence, an account corresponding to the first network address and the third period as a third account which the third terminal currently logs in.

5. The method of claim 2, wherein the adding the first network address, the second period, and the second account to the correspondence between the network address, the period, and the account comprises:
  when the number of service messages corresponding to the first network address and the second account and received within the second period reaches a preset threshold, adding the first network address, the second period and the second account to the correspondence between the network address, the period and the account.

6. The method of claim 1, wherein in the correspondence, the first network address corresponds to multiple accounts;
  wherein the selecting the presentation information matching with the account information of the at least one account comprises:
  for each piece of presentation information, collecting, in the multiple accounts, the number of accounts of which account information matches with the presentation information, obtaining the number of matched accounts corresponding to each piece of presentation information; and
  selecting presentation information with a maximum number of matched accounts.

7. A device for presenting information, comprising:
  a processor and a non-transitory storage, wherein the non-transitory storage stores one or more computer readable instructions, and the processor executes the computer readable instructions stored in the non-transitory storage to:
  receive an information presentation request sent from a first terminal;
  acquire a first network address of the first terminal;
  determine at least one account according to the first network address, a first period to which a current time moment belongs, and a prestored correspondence between a network address, a period and an account; and
  select presentation information matching with account information of the at least one account; and
  send the presentation information to the first terminal;
  wherein the processor executes the computer readable instructions stored in the non-transitory storage to determine an account with a maximum number of service messages according to the first network address, the first period to which the current time moment belongs, and a prestored correspondence between the network address, the period, the account, and the number of sent service messages.

8. The device of claim 7, wherein the processor executes the computer readable instructions stored in the non-transitory storage to:
  receive a service message sent from a second terminal, acquire a first network address of the second terminal, determine a second account which the second terminal currently logs in, and determine a second period to which the current time moment belongs in multiple preset periods; and
  add the first network address, the second period, and the second account to the correspondence between the network address, the period, and the account.

9. The device of claim 8, wherein the processor executes the computer readable instructions stored in the non-transitory storage to:
  acquire all accounts corresponding to the first network address from the correspondence when a service message sent from any terminal with the first network address is not received within a third period in the multiple periods, and add the first network address, the third period, and all accounts corresponding to the first network address to the correspondence between the network address, the period, and the account.

10. The device of claim 9, wherein the processor executes the computer readable instructions stored in the non-transitory storage to:
  modify, in the correspondence when a service message sent from a third terminal with the first network address is received within the third period, an account corresponding to the first network address and the third period as a third account which the third terminal currently logs in.

11. The device of claim 8, wherein the processor executes the computer readable instructions stored in the non-transitory storage to add the first network address, the second period and the second account to the correspondence between the network address, the period and the account when the number of service messages corresponding to the first network address and the second account and received within the second period reaches a preset threshold.

12. The device of claim 7, wherein in the correspondence, the first network address corresponds to multiple accounts;
  wherein the processor executes the computer readable instructions stored in the non-transitory storage to:
  for each piece of presentation information, collect, in the multiple accounts, the number of accounts of which account information matches with the presentation information, obtain the number of matched accounts corresponding to each piece of presentation information, and select presentation information with a maximum number of matched accounts.

13. A non-transitory computer readable storage medium storing computer readable instructions which cause at least one processor to perform operations comprising:
  receiving an information presentation request sent from a first terminal;
  acquiring a first network address of the first terminal;
  determining at least one account according to the first network address, a first period to which a current time moment belongs, and a prestored correspondence between a network address, a period and an account; and
  selecting presentation information matching with account information of the at least one account; and
  sending the presentation information to the first terminal;
  wherein the determining the at least one account according to the first network address, the first period to which the current time moment belongs, and the prestored correspondence between the network address, the period and the account comprises:
  determining an account with a maximum number of service messages according to the first network address, the first period to which the current time moment belongs, and a prestored correspondence between the network address, the period, the account, and the number of sent service messages.

14. The non-transitory computer readable storage medium of claim 13, wherein the computer readable instructions cause the at least one processor to perform operations comprising:
  receiving a service message sent from a second terminal, acquiring a first network address of the second terminal, determining a second account which the second terminal currently logs in, and determining a second period to which the current time moment belongs in multiple preset periods; and adding the first network address, the second period, and the second account to the correspondence between the network address, the period, and the account.

15. The non-transitory computer readable storage medium of claim 14, wherein the computer readable instructions cause the at least one processor to perform operations comprising:

when a service message sent from any terminal with the first network address is not received within a third period in the multiple periods, acquiring all accounts corresponding to the first network address from the correspondence, and adding the first network address, the third period, and all accounts corresponding to the first network address to the correspondence between the network address, the period, and the account.

16. The non-transitory computer readable storage medium of claim 15, wherein after the adding the first network address, the third period, and all accounts corresponding to the first network address to the correspondence between the network address, the period, and the account, the computer readable instructions cause the at least one processor to perform operations comprising:

when a service message sent from a third terminal with the first network address is received within the third period, modifying, in the correspondence, an account corresponding to the first network address and the third period as a third account which the third terminal currently logs in.

17. The non-transitory computer readable storage medium of claim 14, wherein the adding the first network address, the second period, and the second account to the correspondence between the network address, the period, and the account comprises:

when the number of service messages corresponding to the first network address and the second account and received within the second period reaches a preset threshold, adding the first network address, the second period and the second account to the correspondence between the network address, the period and the account.

18. The non-transitory computer readable storage medium of claim 13, wherein in the correspondence, the first network address corresponds to multiple accounts;

wherein the selecting the presentation information matching with the account information of the at least one account comprises:

for each piece of presentation information, collecting, in the multiple accounts, the number of accounts of which account information matches with the presentation information, obtaining the number of matched accounts corresponding to each piece of presentation information; and selecting presentation information with a maximum number of matched accounts.

* * * * *